United States Patent
Lei et al.

(10) Patent No.: US 10,499,239 B2
(45) Date of Patent: Dec. 3, 2019

(54) METHOD AND APPARATUS FOR CELLULAR SUBSCRIPTION TETHERING

(71) Applicant: FORD GLOBAL TECHNOLOGIES, LLC, Dearborn, MI (US)

(72) Inventors: Oliver Lei, Windsor (CA); David Joseph Orris, Allen Park, MI (US); Noorulla Mohammed, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 562 days.

(21) Appl. No.: 15/074,377

(22) Filed: Mar. 18, 2016

(65) Prior Publication Data
US 2017/0272935 A1   Sep. 21, 2017

(51) Int. Cl.
*H04W 8/20* (2009.01)
*H04B 1/3816* (2015.01)
*H04L 29/08* (2006.01)
*H04W 76/30* (2018.01)
*H04W 76/14* (2018.01)
*H04W 84/00* (2009.01)

(52) U.S. Cl.
CPC ............ *H04W 8/20* (2013.01); *H04B 1/3816* (2013.01); *H04L 67/12* (2013.01); *H04L 67/303* (2013.01); *H04W 76/14* (2018.02); *H04W 76/30* (2018.02); *H04W 84/005* (2013.01)

(58) Field of Classification Search
CPC ..... H04M 11/007; H04W 8/20; H04W 76/14; H04W 76/30; H04L 67/303; H04L 67/12; H04B 1/3816

USPC ................ 370/338, 252, 236, 230; 455/3.04
See application file for complete search history.

(56) References Cited

U.S. PATENT DOCUMENTS

| | | | | |
|---|---|---|---|---|
| 6,032,054 | A * | 2/2000 | Schwinke | H04B 1/3877 455/345 |
| 8,457,686 | B2 * | 6/2013 | Przybylski | H04W 4/046 455/41.2 |
| 8,694,058 | B2 * | 4/2014 | Weiss | H04W 8/005 455/41.2 |
| 9,254,798 | B1 * | 2/2016 | Mostafa | B60R 16/03 |
| 2003/0096641 | A1 * | 5/2003 | Odinak | H04M 1/6075 455/569.2 |
| 2008/0287064 | A1 * | 11/2008 | Weiss | H04W 8/005 455/41.2 |
| 2012/0142367 | A1 * | 6/2012 | Przybylski | H04W 4/046 455/456.1 |
| 2012/0214413 | A1 * | 8/2012 | Rose | H04L 63/18 455/41.1 |
| 2013/0023255 | A1 * | 1/2013 | Yang | H04M 1/7253 455/418 |
| 2014/0213238 | A1 * | 7/2014 | Giraud | G07C 5/008 455/418 |

(Continued)

*Primary Examiner* — Kiet M Doan
(74) *Attorney, Agent, or Firm* — Michael Spenner; Brooks Kushman P.C.

(57) ABSTRACT

A system includes a processor configured to access a cellular SIM profile of a portable cellular device connected to a vehicle computer. The processor is also configured to obtain account parameters from the SIM profile, identifying a cellular provider and user account and provide cellular connectivity, using vehicle telematics hardware, through a connection established on the basis of the obtained account parameters.

11 Claims, 3 Drawing Sheets

(56) References Cited

U.S. PATENT DOCUMENTS

2014/0380442 A1* 12/2014 Addepalli ............ H04W 4/046
  726/6
2015/0215954 A1  7/2015 Pal et al.
2015/0222553 A1  8/2015 MacDonald et al.
2016/0126995 A1* 5/2016 Li ..................... H04W 76/10
  455/558

* cited by examiner

METHOD AND APPARATUS FOR CELLULAR SUBSCRIPTION TETHERING

TECHNICAL FIELD

The illustrative embodiments generally relate to a method and apparatus for cellular subscription tethering.

BACKGROUND

Vehicles are frequently provided with telematics systems that provide connection capability to outside signal sources. Types of telematics systems employed include those that leverage a connection of a wireless device, tethered to the telematics system, and those that leverage a built-in modem. Some systems may also use both, using vehicle on-board connectivity when tethered connectivity is not available.

SUMMARY

In a first illustrative embodiment, a system includes a processor configured to access a cellular SIM profile of a portable cellular device connected to a vehicle computer. The processor is also configured to obtain account parameters from the SIM profile, identifying a cellular provider and user account and provide cellular connectivity, using vehicle telematics hardware, through a connection established on the basis of the obtained account parameters.

In a second illustrative embodiment, a computer-implemented method includes determining that a portable cellular device, having a SIM profile associated therewith, is connected to a vehicle computer. The method also includes obtaining user account information, associated with the SIM profile, from the cellular device. The method further includes passing the account information to a telematics control unit, provided to the vehicle and establishing a cellular connection, using vehicle telematics hardware in conjunction with the obtained user account information.

In a third illustrative embodiment, a non-transitory computer readable storage medium stores instructions that, when executed, cause a processor to perform a method including determining that a portable cellular device, having a SIM profile associated therewith, is connected to a vehicle computer. The method also includes obtaining user account information, associated with the SIM profile, from the cellular device. Further, the method includes passing the account information to a telematics control unit, provided to the vehicle and establishing a cellular connection, using vehicle telematics hardware in conjunction with the obtained user account information.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
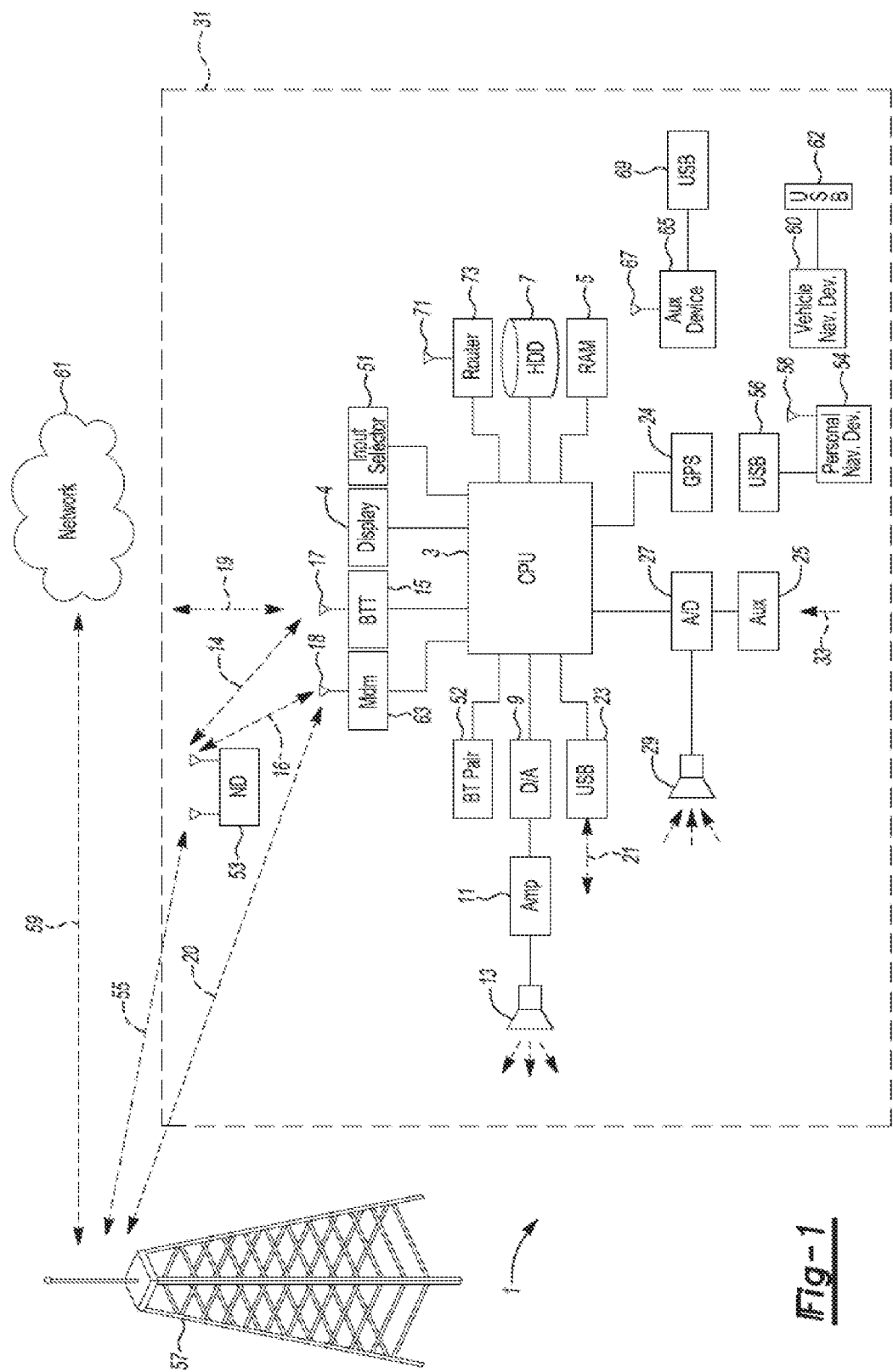
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

When a user brings a cellular device into a vehicle, the vehicle environment can attenuate the signal from the user's phone. While the signal decay may, in some cases, be slight, the signal is already constrained to some extent by the limited capabilities of the device's internal antenna (due to size and placement constraints). A vehicle telematics unit, on the other hand, can leverage powerful internal hardware and a larger, strategically placed antenna, to draw a more powerful signal for an on-board modem, for example. This is of little help to a brought-in phone, however, since the vehicle hardware and antenna are not typically available for use by the brought-in cellular phone.

While a vehicle cellular service, provided through a vehicle modem, can provide a consistent and stronger signal, for at least the reasons noted above, this service may be tied to an existing carrier agreement arranged by an automotive original equipment manufacturer (OEM). This may result in a vehicle owner having multiple service contracts, including one for a portable device (such as a phone) and one for a vehicle. This can be especially true if the user's portable device carrier is different from the carrier selected by an automotive OEM for provision of cellular services to a vehicle. Since the user is unlikely to be using more than one of the portable device and the vehicle modem at the same time, this can result in redundant service contract fees.

The illustrative embodiments propose methods and apparatuses for leveraging an existing cellular contract, with a mobile device provider, while at the same time providing use of the more powerful in-vehicle hardware and antenna capabilities. This can both improve the user experience and save the user some money.

Figure 2:
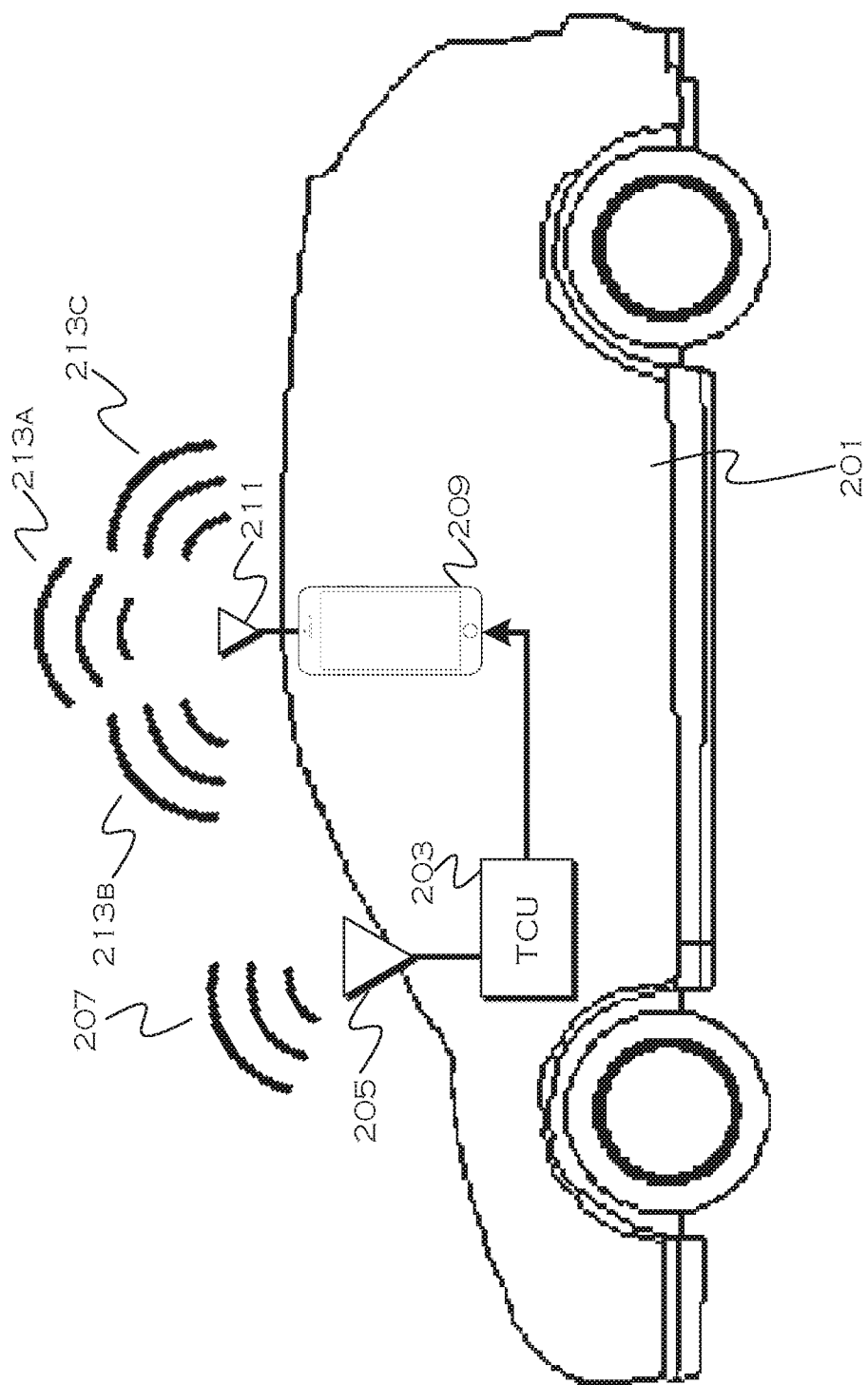
FIG. 2 shows an illustrative vehicle including telematics capabilities.

FIG. 2 shows an illustrative vehicle including telematics capabilities. This is an illustrative representation, visually demonstrating attenuation of a cellular signal from a portable device. The vehicle 201 is provided with an on-board modem in conjunction with a telematics control module 203. This modem has access to a vehicle transceiver, including an antenna 205. By using the antenna 205 and TCU hardware 203, the vehicle modem can pull a powerful and consistent cellular signal 207, with minimal vehicle attenuation.

At the same time, a wireless device 209 may be tethered (wired or wirelessly) to the TCU or another vehicle computing system. The wireless device also produces a signal through an onboard transceiver, which also includes access to an antenna 211. The signal, however, may be weaker 213a than the vehicle signal. The signal may also be partially blocked 213b or fully blocked 213c when encountering vehicle environmental components. While it is unlikely that the full signal will be completely blocked, this interference can still result in a diminished signal strength, which can affect device capability such as call provision and WiFi transmission and receipt capability.

The solution demonstrated in the illustrative embodiments allows the user's SIM profile (which identifies, among other things, user account and provider information) from the user's wireless device to be used in a vehicle. That is, instead of using a pre-defined SIM profile, installed by an OEM, the vehicle can instead use a user's SIM profile to establish a cellular connection. Since the user's SIM profile is already tied to a user account, the billing and provider information will be used from the user's SIM profile and thus provide a suitable basis for cellular connection. This allows the vehicle, in turn, to serve out a wireless (e.g., without limitation, wifi) signal to devices in the vehicle, as well as to complete calls using the onboard hardware and antenna to establish a stronger signal. At the same time, the user is not paying for additional service even though the user is engaging the on-board telematics unit, the user is instead simply using service for which the user already pays. The same credentials that are used to connect the user's phone, when a cellular connection is made from the phone, are used by the vehicle to establish a communication session.

Figure 3:
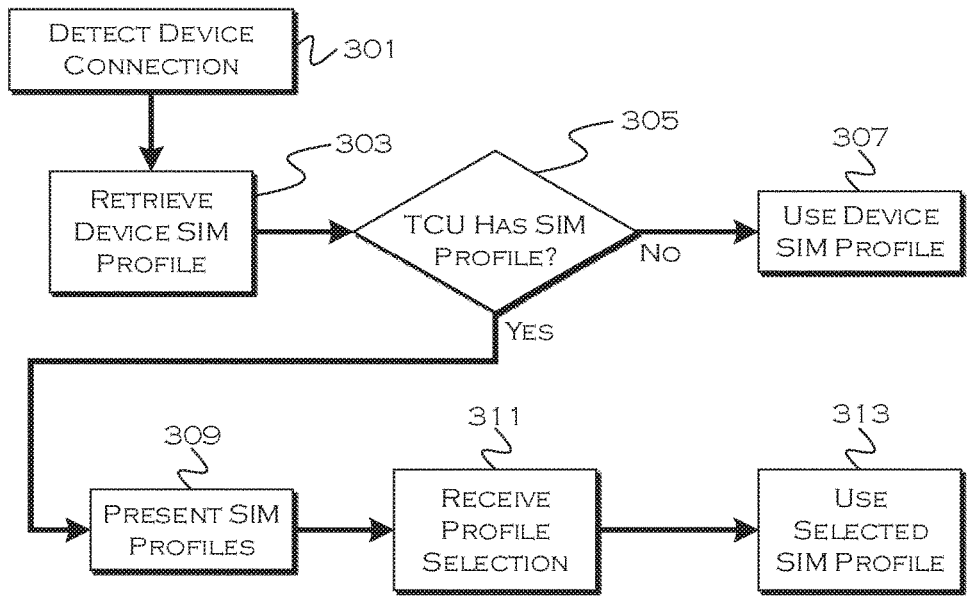
FIG. 3 shows an illustrative process for SIM profile selection and use.

FIG. 3 shows an illustrative process for SIM profile selection and use. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process detects that a mobile device is tethered or paired to a vehicle computing system 301. The mobile device, to be suitable for this process, will include a SIM profile or similar information, identifying a user account and cellular service provider. This information can be retrieved from the mobile device 303 in accordance with permissions granted to the vehicle with respect to mobile device data access.

When the appropriate SIM profile has been received, the process will also check to see if the on-board telematics control unit (and attendant hardware) has a SIM profile associated therewith. For example, a user may buy a vehicle with limited data and minutes assigned to a SIM profile associated with the vehicle. In order not to use up all the minutes or data on the vehicle plan, when more expansive plans may be had in conjunction with a user device, the user may generally want to use the SIM profile of a portable cellular device. This allows the user to save the minutes and data of the vehicle plan for times when the cellular device SIM profile does not result in service, or when a cellular device is not present for leveraging the SIM profile thereof.

In other instances, a vehicle may be provided with connection hardware, or at least minimal hardware such as an antenna, but have no SIM profile assigned thereto. This could be, for example, because a contract expired or because the vehicle was a rental vehicle. Or, in the case of a rental vehicle, for example, an on-board SIM profile may exist but be locked for use by vehicle data gathering services only (for use by the rental company), preventing renter use of the telematics system through the on-board SIM profile. In these instances, if a user can load their personal SIM profile from a mobile device into the vehicle, the telematics hardware can be used in conjunction with the user's personal SIM profiles.

If there is no other profile available 305, due to the onboard system not having a profile or the on-board SIM profile not being available for general use by a driver, the process will use the identified device SIM profile as a SIM profile for purposes of establishing a cellular connection 307.

On the other hand, if multiple SIM profiles are available 305, the process may present the user with a list of SIM profiles for use 309. Certain SIM profiles could also be set for default use, if multiple profiles are present, if the user does not want to select a particular SIM profile each time that multiple profiles are present. Once the user selects a SIM profile 311, the process will instruct cellular connection using the selected SIM profile 313.

Figure 4:
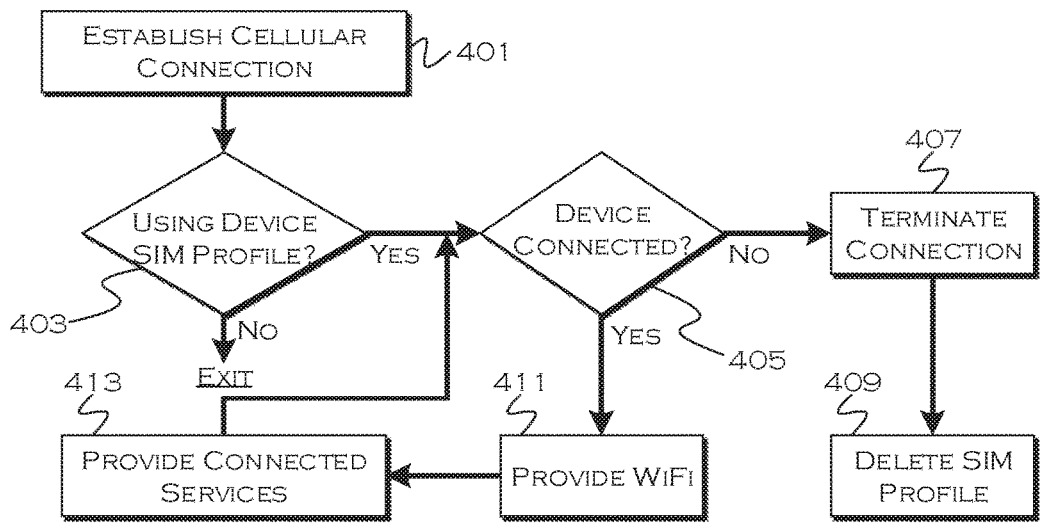
FIG. 4 shows an illustrative process for connection termination.

FIG. 4 shows an illustrative process for connection termination. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process establishes, or has established, a cellular connection using a particular SIM profile 401. This could be an on-board profile or an accessed user portable device SIM profile. In this example, the user SIM profile is not stored in the vehicle, so that the profile does not persist when the user leaves the vehicle. This could be changed if desired, but this model allows a user to use the SIM profile in a rental vehicle, for example, or a hired vehicle, without worrying about future drivers or passengers using data or services assigned to the particular SIM profile.

If the current connection is using a user's SIM profile 403 (i.e., a device SIM profile), the process will determine if the device is still connected to the vehicle 405. A device may become disconnected from the vehicle by accident or intent, and in this example disconnection of the device is the basis for deletion of the SIM profile and termination of the connection using that SIM profile. This is useful, for example, in a hired vehicle situation, where a user may leave the vehicle but the vehicle is not actually powered down. In other examples, power down of the vehicle may terminate the connection and cause deletion of the SIM profile, or, as noted, the SIM profile may persist through multiple uses of the vehicle.

While the device from which the SIM profile was retrieved (the profile-providing device) is connected to the vehicle, and thus a cellular service connection is established using that SIM profile, the vehicle can provide connected services to devices within the vehicle. This can include, for example, serving WiFi out to the devices 411. Other connected services available to the device can also be facilitated in this manner 413, and if any fees or costs are attendant, they can be charged to the appropriate account designated by the SIM profile. This can effectively, among other things, turn the vehicle into a mobile hot-spot, which can dynamically leverage SIM profiles of different users to provide varied services in accordance with user accounts, while charging the appropriate accounts for the appropriate users. This allows, for example, drivers of hired cars to provide telematics hardware for use by passengers, without having the driver bear the cost of connectivity.

Once the connection to a given wireless device, from which the SIM profile is used, is terminated 407, the system can terminate the cellular connection and delete the SIM profile 409 from any onboard vehicle memory. Cellular services could be immediately resumed via an onboard SIM profile, if desired, but the temporarily used SIM profile would cease to exist on the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
  a processor configured to:
  access a cellular SIM profile of a portable cellular device wirelessly connected to a vehicle computer;
  provide a choice on a vehicle display, between an onboard SIM profile and the portable cellular device SIM profile;
  obtain account parameters allowing connectivity using a chosen SIM profile; and provide cellular connectivity, using vehicle telematics hardware, through a connection established via the telematics hardware based on the obtained account parameters;
  wherein the processor is further configured to terminate cellular connectivity in response to disconnection of the wirelessly connected portable cellular device from the vehicle computer, when the SIM profile of the portable cellular device was the chosen SIM profile; and
  wherein the processor is configured to delete the cellular SIM profile and account parameters from a vehicle memory upon termination of cellular connectivity.

2. The system of claim 1, wherein the processor is further configured to serve out WiFi services to in-vehicle devices, the services facilitated by a cellular connection established using the cellular connectivity.

3. The system of claim 1, wherein the processor is further configured to terminate cellular connectivity when a vehicle is powered down.

4. The system of claim 1, wherein the processor is configured to store the chosen SIM profile and obtained account information such that the SIM profile and obtained account information persists through multiple vehicle drive cycles.

5. A computer-implemented method, comprising:
  determining that a portable cellular device, having a SIM profile associated therewith, is connected to a vehicle computer;
  obtaining user account information, associated with the SIM profile, from the cellular device;
  passing the account information to a vehicle-based telematics control unit, provided to the vehicle;
  establishing a cellular connection, using vehicle telematics hardware in conjunction with the obtained user account information; and
  deleting user account information from the telematics control unit when the cellular device becomes disconnected from the vehicle computer; and
  storing the account information in a vehicle memory, such that the account information persists and is usable through multiple vehicle drive cycles; and
  further comprising terminating the cellular connection when the cellular device becomes disconnected from the vehicle computer.

6. The method of claim 5, further comprising:
  providing a user with a choice between an onboard SIM profile and the cellular device associated SIM profile for use in establishing the cellular connection.

7. The method of claim 5, further comprising providing wireless connectivity services to in-vehicle devices, the services facilitated by the cellular connection.

8. The method of claim 5, further comprising terminating cellular connectivity in response to a vehicle is power down.

9. A non-transitory computer readable storage medium, storing instructions that, when executed, cause a processor to perform a method comprising:
  determining that a portable cellular device, having a SIM profile associated therewith, is wirelessly connected to a vehicle computer;
  obtaining user account information, associated with the SIM profile, from the cellular device;
  passing the account information to a telematics control unit, provided to the vehicle;

providing a user with a choice between an onboard SIM, profile and the cellular establishing a cellular connection, using vehicle telematics hardware in conjunction with the obtained user account information when the user selects the cellular device terminating the cellular connection when the wirelessly connected cellular device becomes disconnected from the vehicle computer when the connection was established using the cellular device associated SIM profile; and further comprising deleting user account information from the telematics control unit when the cellular device becomes disconnected from the vehicle computer.

10. The storage medium of claim 9, the method further comprising providing wireless connectivity services to in-vehicle devices, the services facilitated by the cellular connection.

11. The storage medium of claim 9, the method further comprising terminating cellular connectivity when a vehicle is powered down.

* * * * *